United States Patent
Urakami et al.

(10) Patent No.: US 10,795,587 B2
(45) Date of Patent: Oct. 6, 2020

(54) STORAGE SYSTEM AND CLUSTER CONFIGURATION CONTROL METHOD

(71) Applicant: HITACHI, LTD., Tokyo (JP)

(72) Inventors: Akira Urakami, Tokyo (JP); Takayuki Abe, Tokyo (JP)

(73) Assignee: HITACHI, LTD., Tokyo (JP)

(*) Notice: Subject to any disclaimer, the term of this patent is extended or adjusted under 35 U.S.C. 154(b) by 0 days.

(21) Appl. No.: 16/296,961

(22) Filed: Mar. 8, 2019

(65) Prior Publication Data
US 2019/0332282 A1 Oct. 31, 2019

(30) Foreign Application Priority Data

Apr. 26, 2018 (JP) .................. 2018-085691

(51) Int. Cl.
*G06F 3/06* (2006.01)
*H04L 29/08* (2006.01)
*H04L 12/24* (2006.01)

(52) U.S. Cl.
CPC ............ *G06F 3/0617* (2013.01); *G06F 3/067* (2013.01); *G06F 3/0629* (2013.01); *H04L 41/0806* (2013.01); *H04L 67/1097* (2013.01)

(58) Field of Classification Search
CPC ...... G06F 3/0617; G06F 3/0629; G06F 3/067; H04L 41/0806; H04L 41/0816; H04L 43/0805; H04L 43/0817; H04L 67/1097
See application file for complete search history.

(56) References Cited

U.S. PATENT DOCUMENTS

| | | | |
|---|---|---|---|
| 6,449,641 B1 * | 9/2002 | Moiin | G06F 9/5061 709/201 |
| 8,352,692 B1 * | 1/2013 | Jordan | H04L 67/1093 711/162 |
| 2008/0243866 A1 * | 10/2008 | Pandey | G06F 16/10 |
| 2017/0359243 A1 * | 12/2017 | Deuri | H04L 67/1097 |

FOREIGN PATENT DOCUMENTS

JP    2014-075027 A    4/2014

* cited by examiner

*Primary Examiner* — Larry T Mackall
(74) *Attorney, Agent, or Firm* — Volpe and Koenig, P.C.

(57) ABSTRACT

It is determined whether the importance of an object storage node is equal to or larger than a predetermined importance and the reliability of the object storage node is equal to or larger than a predetermined reliability, the object storage node being a storage node set as an object among N storage nodes that are members of a storage cluster, N being an integer equal to or larger than 3. When the determination result is true, reintegration of the object storage node is performed. The importance of the object storage node depends on highness of availability when assuming that the object storage node has left the storage cluster. The reliability of the object storage node depends on the tendency of operation of the object storage node.

7 Claims, 11 Drawing Sheets

NODE MANAGEMENT TABLE
221

| NODE ID | STATE | IMPOR-TANCE | RELI-ABILITY | DATA IMPORTANCE | I/O IMPORTANCE | CLUSTER IMPORTANCE |
|---|---|---|---|---|---|---|
| S0 | ACTIVE | LOW | HIGH | LOW | LOW | LOW |
| S1 | ACTIVE | HIGH | HIGH | HIGH | LOW | LOW |
| S2 | ACTIVE | HIGH | LOW | LOW | HIGH | LOW |
| S3 | ACTIVE | HIGH | LOW | LOW | LOW | HIGH |
| S4 | ACTIVE | LOW | HIGH | LOW | LOW | LOW |
| ... | ... | ... | ... | ... | ... | ... |

FIG.5

DATA ARRANGEMENT MANAGEMENT TABLE
222

| GROUP ID | NODE ID (MASTER DATASET) | NODE ID (MIRROR DATASET) |
|---|---|---|
| G0 | S0 | - |
| G1 | S0 | S1 |
| G2 | S3 | - |
| G3 | S0 | S1 |
| ... | ... | ... |

FIG.6

I/O ARRANGEMENT MANAGEMENT TABLE
223

| PAIR ID | NODE ID (ACTIVE) | NODE ID (STANDBY) |
|---|---|---|
| P0 | S0 | S1 |
| P1 | S1 | S2 |
| P2 | S2 | S3 |
| P3 | S1 | S3 |
| ... | ... | ... |

FIG.7

CLUSTER ARRANGEMENT MANAGEMENT TABLE
224

| NODE ID (PRIMARY) | NODE ID (SECONDARY1) | NODE ID (SECONDARY2) | NODE ID (SECONDARY3) | ... |
|---|---|---|---|---|
| S0 | S1 | S2 | S3 | ... |

FIG.8

NODE FAILURE MANAGEMENT TABLE
225

| TIME (801) | NODE ID (802) |
|---|---|
| 2017/12/24 10:15:20 | S3 |
| 2017/12/23 10:15:20 | S2 |
| 2016/09/20 03:10:00 | S4 |
| ... | ... |

FIG.9

REINTEGRATION DETERMINATION TABLE
226

| | | RELIABILITY | |
|---|---|---|---|
| | | HIGH | LOW |
| IMPORTANCE | HIGH | REINTEGRATION | MAINTENANCE |
| | LOW | MAINTENANCE | MAINTENANCE |

DATA ARRANGEMENT MANAGEMENT TABLE
222

| GROUP ID | NODE ID (MASTER DATASET) | NODE ID (MIRROR DATASET) |
|---|---|---|
| G0 | S0 | - |
| G1 | S0 | S1 |
| G2 | S3 | - |
| G3 | S0 | S1 |
| G4 | S2 | S3 |
| ... | ... | ... |

I/O ARRANGEMENT MANAGEMENT TABLE
223

| PAIR ID | NODE ID (ACTIVE) | NODE ID (STANDBY) |
|---|---|---|
| P0 | S0 | S1 |
| P1 | S1 | S2 |
| P2 | S2 | S3 |
| P3 | S3 | - |
| ... | ... | ... |

CLUSTER ARRANGEMENT MANAGEMENT TABLE
224

| NODE ID (PRIMARY) | NODE ID (SECONDARY1) | NODE ID (SECONDARY2) | NODE ID (SECONDARY3) | NODE ID (SECONDARY4) |
|---|---|---|---|---|
| S0 | S1 | S2 | S3 | - |

STORAGE SYSTEM AND CLUSTER CONFIGURATION CONTROL METHOD

CROSS-REFERENCE TO PRIOR APPLICATION

This application relates to and claims the benefit of priority from Japanese Patent Application number 2018-85691, filed on Apr. 26, 2018 the entire disclosure of which is incorporated herein by reference.

BACKGROUND

The present invention generally relates to control of a storage cluster including a plurality of storage nodes.

A scale-out type distributed computation system including a plurality of computation nodes is known (for example, PTL1).

[PTL1] Japanese Patent Laid-Open No. 2014-075027

SUMMARY

It is conceivable to maintain the distributed computation system by causing a computation node where a failure (for example, unexpected reboot) occurred to leave the distributed computation system.

However, in a case where a cluster including a plurality of nodes is a storage cluster including a plurality of storage nodes, it is not desired to hold an object node, such as a storage node where a failure occurred, in a state left from the storage cluster. This is because each storage node stores a user dataset that is a dataset to be an object of I/O from a host system of the storage cluster, and when the object node remains in the state left from the storage cluster, the redundancy of the user dataset in the object node may deteriorate. For example, in a case where there is a user dataset existing only in the object node, the host system cannot access this user dataset.

In order to avoid such a problem, it is conceivable to perform reintegration for leaving the object node from the storage cluster and making it a member of the storage cluster again.

When assuming that the reintegration of the object node is performed under the operation of an administrator of the storage cluster, the burden of the administrator for management is large.

Therefore, it is conceivable to uniformly reintegrate the object node, namely, perform the reintegration automatically. However, this may deteriorate the stability of the storage cluster. For example, if the failure having occurred in the object node is a failure possibly occurring very frequently, the reintegration of the object node will occur frequently.

A cluster configuration control apparatus (for example, first storage node) determines whether the importance of an object storage node (for example, second storage node) is equal to or larger than a predetermined importance and the reliability of the object storage node is equal to or larger than a predetermined reliability, the object storage node being a storage node set as a target among N storage nodes that are members of a storage cluster, N being an integer equal to or larger than 3. When the determination result is true, the cluster configuration control apparatus reintegrates the object storage node (causes the object storage node to leave the storage cluster and causes the object storage node to become a member of the storage cluster again). The importance of the object storage node depends on highness of availability when assuming that the object storage node has left the storage cluster. The reliability of the object storage node depends on tendency of operation of the object storage node.

The cluster configuration control apparatus may be any storage node (for example, a primary master storage node described below) in the storage cluster or may be a management system of the storage cluster (storage system).

According to the present invention, it is possible to prevent the stability of the storage cluster from deteriorating even when the reintegration of an object storage node is automated.

BRIEF DESCRIPTION OF THE DRAWINGS

FIG. 5 illustrates an exemplary configuration of a data arrangement management table;

FIG. 6 illustrates an exemplary configuration of an I/O arrangement management table;

FIG. 7 illustrates an exemplary configuration of a cluster arrangement management table;

FIG. 8 illustrates an exemplary configuration of a node failure management table;

FIG. 9 illustrates an exemplary configuration of a reintegration determination table;

DESCRIPTION OF EMBODIMENTS

Figure 1:
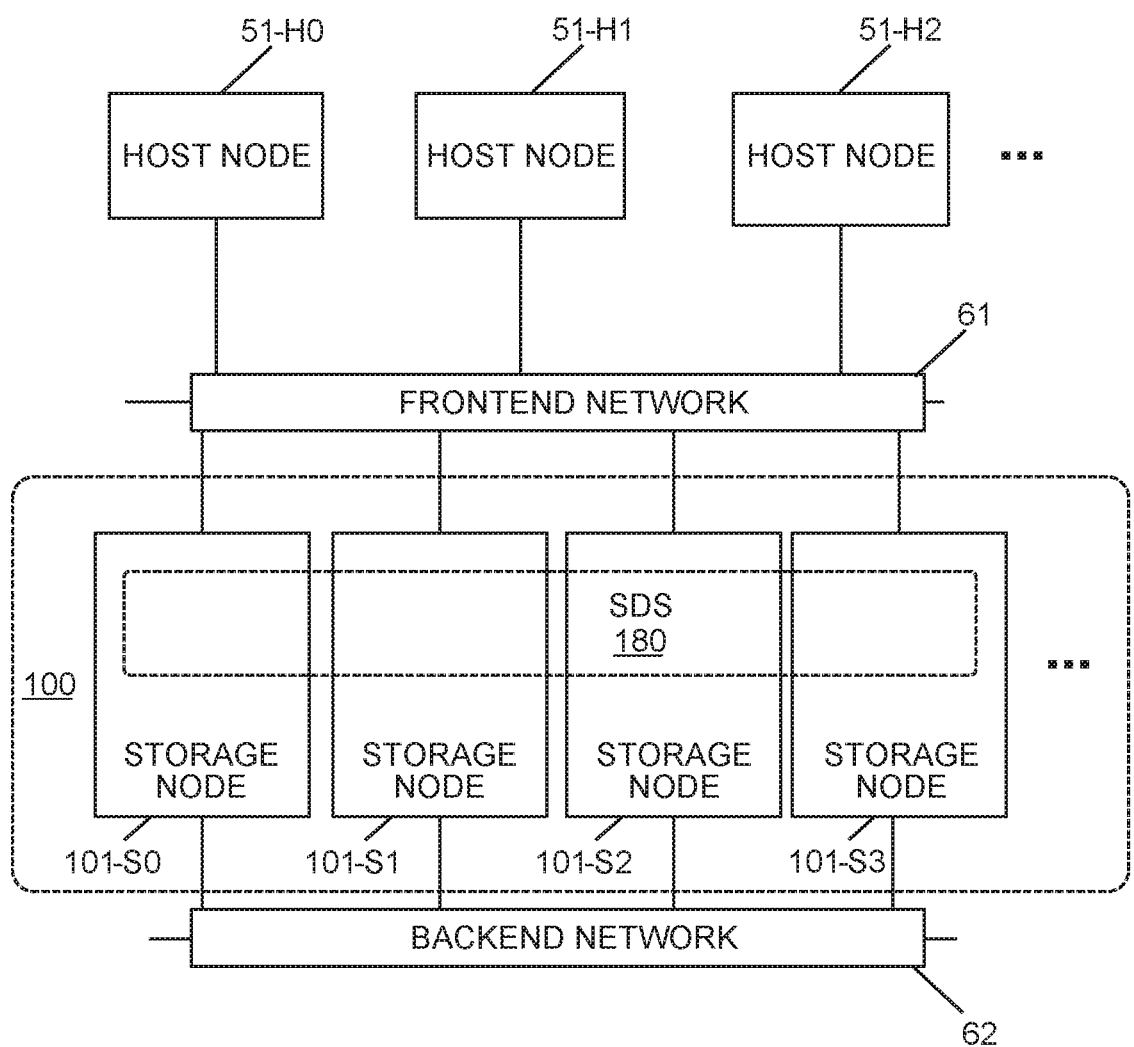
FIG. 1 illustrates an entire system configuration including a storage system according to one embodiment.

In the following description, "interface unit" may be one or more interfaces. The one or more interfaces may be one or more communication interface devices of the same kind (for example, one or more network interface cards (NICs)) or may be two or more disparate communication interface devices (for example, an NIC and a host bus adapter (HBA)).

Further, in the following description, "memory unit" is one or more memories, and may typically be a primary storage device. At least one memory of the memory unit may be a volatile memory or a nonvolatile memory.

Further, in the following description, "PDEV unit" is one or more PDEVs, and may typically be an auxiliary storage device. "PDEV" stands for Physical storage DEVice, and typically is a nonvolatile storage device, for example a hard disk drive (HDD) or a solid-state drive (SSD). Namely, the PDEV unit is an exemplary storage device unit.

Further, in the following description, "storage unit" is at least one of the memory unit and the PDEV unit (typically, at least a memory unit).

In the following description, "processor unit" is one or more processors. At least one processor is typically a microprocessor such as a central processing unit (CPU), or may be another kind of processor such as a graphics-processing unit (GPU). At least one processor may be a single core or a multi-core. At least one processor may be a hardware circuit that performs part or the whole of processing (for example, a field-programmable gate array (FPGA) or a processor in a broad sense such as an application specific integrated circuit (ASIC).

Further, in the following description, there is a case where an expression such as "xxx table" is used to explain information that can obtain an output for an input. However, this kind of information may be data of any structure, or may be a learning model such as a neural network that generates an output for an input. Accordingly, an "xxx table" can be called "xxx information". Further, in the following description, the configuration of each table is an example, one table may be divided into two or more tables, and the whole or part of two or more tables may be one table.

Further, in the following description, there is a case where the processing is described with a "program" as the subject. The program, when executed by the processor unit, performs predetermined processing by appropriately using the storage unit and/or the interface unit. Therefore, the subject of the processing may be the processor unit (or a device such as a controller incorporating the processor unit). The program may be installed from a program source on an apparatus such as a computer. The program source may be, for example, a (non-transitory) recording medium that can be read by a program distribution server or a computer. Further, in the following description, two or more programs may be realized by only one program, or one program may be realized by two or more programs.

Further, in the following description, "storage system" is a system including a storage cluster that includes a plurality of storage nodes. The storage system may be the storage cluster itself, or may include a storage node other than the storage nodes belonging to the storage cluster. The storage system may typically be referred to as a scale-out type storage system or a distributed storage system. The "storage node" is a device as a member of the storage system (particularly, a storage cluster), and may be a general-purpose computer or a dedicated computer (for example, a storage device such as a so-called disk array device having a plurality of PDEVs). The storage system may have a redundancy configuration group. The redundancy configuration may be configured as a plurality of storage nodes, such as Erasure Coding, redundant array of independent nodes (RAIN), and inter-node mirroring, or may be configured as a single computer (for example, a storage node) such as one or more RAID, i.e., redundant array of independent (or inexpensive) disks, group, as at least a part of the PDEV unit.

Further, in the following description, "dataset" is a piece of logical electronic data as seen from a program, such as an application program, and may be any of, for example, record, file, key value pair, and tuple. Particularly, among various datasets, a dataset to be input or output in response to an input/output (I/O) request from a host system of the storage system is referred to as "user dataset".

Further, "program cluster" includes one or more active I/O control programs and one or more standby I/O control programs. In each program cluster, the relationship between the active I/O control program and the standby I/O control program may be any of one-to-one, one-to-many, many-to-one, and many-to-many. Hereinafter, to simplify the description, it is assumed that the active I/O control program and the standby I/O control program are in the one-to-one relationship, and accordingly the program cluster is referred to as "program pair".

Further, in the following description, in the case of describing the same kind of elements without distinguishing them, the common part of reference characters will be used. In the case of describing the same kind of elements so as to be distinguished from each other, individual reference characters may be used. For example, when describing storage nodes without distinguishing them particularly, they are simply described as "storage nodes 101". When describing respective nodes distinctively, expressions such as "storage node 101-S0", "storage node 101-S1" or the like may be used. In this case, among the reference characters of respective elements, the numeral following the hyphen indicates ID of each element, or ID of an element incorporating this element.

Hereinafter, one embodiment of the present invention will be described.

FIG. 1 illustrates an entire system configuration including a storage system according to one embodiment.

One or more host nodes (examples of the host system) 51 and a plurality of storage nodes 101 constituting a storage system 100 are coupled to a frontend network 61. The plurality of storage nodes 101 is coupled to a backend network 62. Both the frontend network 61 and the backend network 62 may be communication networks including fibre channel, Ethernet (registered trademark), InfiniBand, local area network (LAN), or the like. The frontend network 61 and the backend network 62 may be integrated.

The host node 51 is a computer (for example, a general-purpose computer) that transmits a read request or a write request (that may be collectively referred to as I/O request) to the storage system 100. A virtual machine (VM) implemented by at least one physical computer may function as the host node 51. The reference character of the host node has a configuration of "51-Hn" (n is an integer such as 0, 1, 2, . . . ), in which "Hn" represents ID of this host node.

Although the storage system 100 includes N storage nodes 101 (the value of N will be described later), the storage system 100 is the basis of an SDS 180 constructed by each general-purpose computer executing software having a storage function. Although the SDS 180 may be constructed in each storage node 101, the SDS 180 in the present embodiment extends over a plurality of storage nodes 101. The reference character of the storage node has a configuration of "101-Sn" (n is an integer such as 0, 1, 2, . . . ), in which "Sn" represents ID of this storage node.

Further, in addition to the SDS 180, the storage system 100 may be the basis of software defined host node 51 or may implement one or more virtual machines as the host node 51. Namely, the storage system and the host node may exist virtually on the same system platform.

A management system (not illustrated) may be coupled to at least one of the frontend network 61 and the backend network 62. The management system is a computer system that manages the storage system 100 (or a computer system including the storage system 100 and the host node 51). For example, the management system can monitor performances of the storage system 100 and transmit various instructions.

A virtual machine implemented by at least one physical computer may function as the management system.

Figure 2:
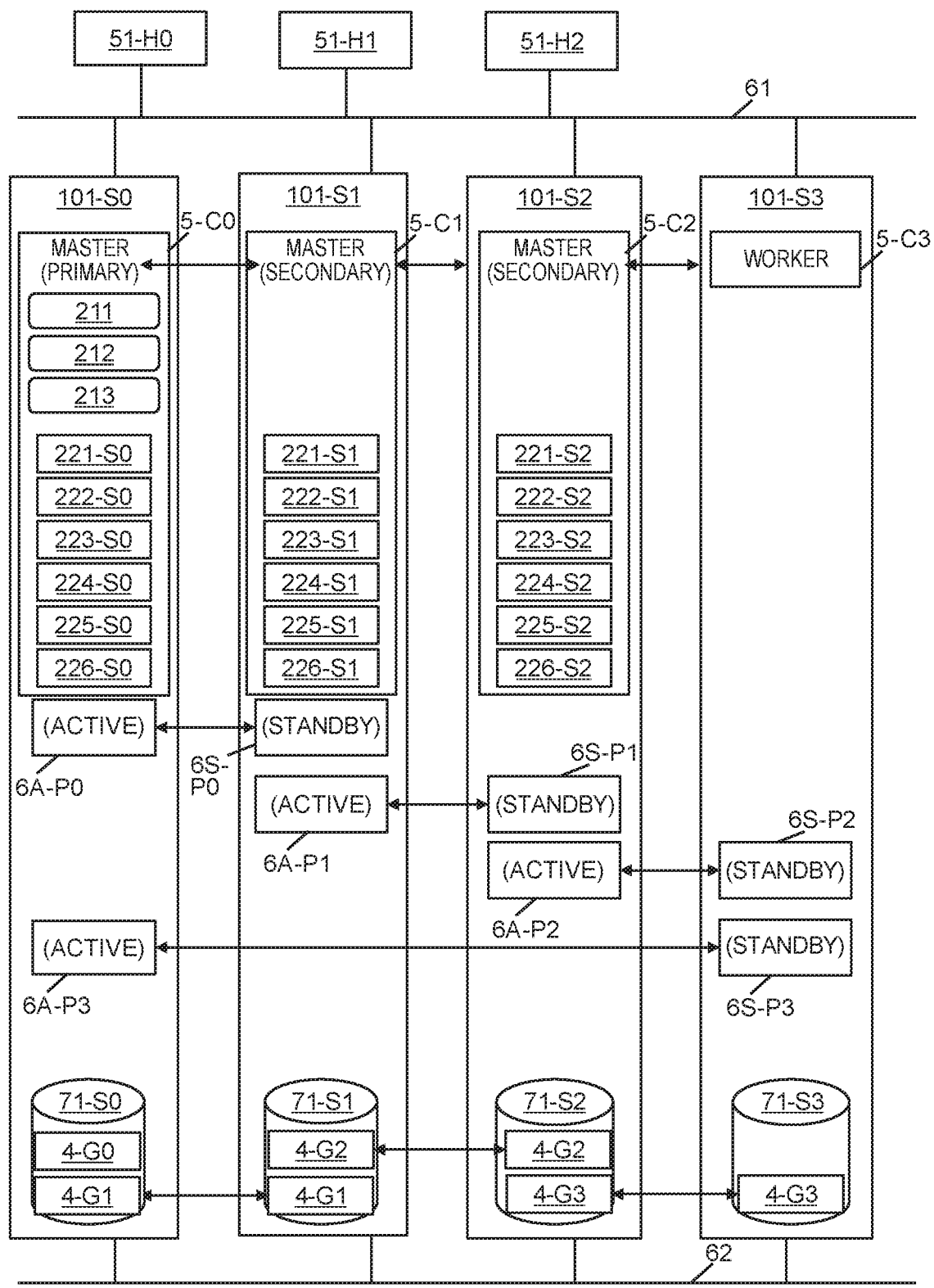
FIG. 2 illustrates an exemplary arrangement of programs and datasets in the storage system.

FIG. 2 illustrates an exemplary arrangement of programs and datasets in the storage system 100.

Each of the plurality of storage nodes 101 has logical storage space 71. The logical storage space 71 in the storage node 101 is typically a storage space based on the PDEV unit (for example, an integral disk) owned by the storage node 101 itself. At least a part of the logical storage space 71 may be a storage space associated with a storage space provided by an external storage (not illustrated). The reference character of the logical storage space has a configuration of "71-Sn" (n is an integer such as 0, 1, 2, . . . ), in which "Sn" represents ID of the storage node 101 having this logical storage space. More specifically, from "Sn" in the reference character of the logical storage space, the storage node 101 where the logical storage space exits can be known.

User datasets 4 are stored in the logical storage space 71. The redundancy of each user dataset 4 is 0 or more. The value (redundancy+1) is the number of the user datasets 4. The reference character of the user dataset has a configuration of "4-Gn" (n is an integer such as 0, 1, 2, . . . ), in which "Gn" represents ID of a group of the same user datasets. More specifically, from "Gn" in the reference character of the user dataset, the group to which the user dataset belongs can be known.

Two or more program pairs (an example of the program cluster) including a plurality of I/O control programs 6 are arranged in the plurality of storage nodes 101. Each of the I/O control programs 6 is a program performing input/output (I/O) for a logical chunk (an example of logical storage area) associated with this I/O control program. Hereinafter, regarding the I/O control programs 6, the I/O control program 6 whose state is active may be referred to as "active I/O control program 6A", and the I/O control program 6 whose state is standby may be referred to as "standby control program 6S".

Each program pair is a pair of the active I/O control program 6A and the standby I/O control program 6S (I/O control program 6S that becomes active instead of this active I/O control program 6A in the case of stoppage of the active I/O control program 6A). Hereinafter, the active I/O control program 6A belonging to program pair Pn (a program pair whose ID is Pn) is referred to as "active I/O control program 6A-Pn" and the standby I/O control program 6S belonging to the program pair Pn is referred to as "standby I/O control program 6S-Pn" (n is an integer such as 0, 1, 2, . . . ).

Active I/O control program 6A and standby I/O control program 6S of different program pairs may be mixed in one storage node 101. A plurality of standby I/O control programs 6S out of a plurality of program pairs may be aggregated in some of the storage nodes 101 (in other words, any active I/O control program 6A may not be arranged for the storage node 101 where the standby I/O control program 6S is arranged).

The active I/O control program 6A, when executed by CPU 301 (refer to FIG. 3) in the storage node 101 where this I/O control program 6A is arranged, performs writing of dataset for one or more logical storage spaces 71 owned by one or more storage nodes 101 (for example, one or more storage nodes 101 including the storage node 101 having this I/O control program). Typically, the writing of dataset is performed according to a redundancy technique such as RAID or Erasure Coding.

A plurality of cluster control programs 5 is arranged for the plurality of storage nodes in the storage system 100. The reference character of the cluster control program has a configuration of "5-Cn" (n is an integer such as 0, 1, 2, . . . ), in which "Cn" represents ID of this cluster control program.

Each of the plurality of cluster control programs 5 manages the storage cluster, receives a request (for example, an I/O request or another request) from the host node 51 (or the management system (not illustrated)), and evokes a program such as the I/O control program 6 in response to the request. As an example of management of the storage cluster, there is control of resource arrangement. The resource arrangement is arrangement of physical or logical resources in the storage cluster, such as arrangement of user datasets and arrangement of I/O control programs.

The plurality of cluster control programs 5 includes Q master cluster control programs 5 and one or more worker cluster control programs 5, in other words one or more cluster control programs 5 other than the master cluster control program 5. The Q master cluster control programs 5 communicate with each other. The storage node 101 where the master cluster control program 5 is arranged can be referred to as "master storage node 101", and the storage node 101 where the worker cluster control program 5 is arranged can be referred to as "worker storage node 101". In order to prevent split-brain syndrome from occurring even when the master cluster control program 5 is split due to communication path failure between the master storage nodes 101 or the like, Q is an integer equal to or larger than 3. As a result, N is an integer equal to or larger than 3 because N is equal to or larger than Q.

Each master cluster control program 5 has an importance determination function 211, a reliability determination function 212, and a reintegration determination function 213. The Q master cluster control programs 5 include one primary master cluster control program 5 (for example, 5-C0) and one or more secondary master cluster control programs 5, namely one or more master cluster control programs 5 other than the primary master cluster control program 5. Respective functions 211 to 213 of each master cluster control program 5 are exerted when the master cluster control program 5 becomes primary. The importance determination function 211 is a function for determining the importance. The reliability determination function 212 is a function for determining the reliability. The reintegration determination function 213 is a function for performing reintegration determination. In the case of stoppage of the primary master cluster control program 5, any of one or more secondary master cluster control programs 5 becomes primary instead of this cluster control program 5.

Each master cluster control program 5 manages a node management table 221, a data arrangement management table 222, an I/O arrangement management table 223, a cluster arrangement management table 224, a node failure management table 225, and a reintegration determination table 226. Respective reference characters of these tables 221 to 226, as well as the reference character of the logical storage space, include "-Sn" (n is an integer such as 0, 1, 2, . . . ) and "Sn" represents ID of the storage node 101 having this table. More specifically, from "Sn" in the reference character of the table, the storage node 101 in which the table exists can be known. These tables 221 to 226 are synchronized among the master storage nodes 101. The configuration of each table will be described in detail below.

The above is an exemplary arrangement of the programs and the datasets in the storage system 100. The cluster control program 5 (for example, the master cluster control program 5) may provide or manage the logical storage space 71 in the storage node 101 having this program 5. The logical storage space 71 may be divided into one or more logical chunks (an example of the logical storage area). User datasets may be stored in the logical chunk. One or more user datasets may be stored on one logical chunk, or one user dataset may be stored so as to extend over two or more logical chunks. The PDEV unit in the storage node 101 may have a plurality of physical chunks (an example of the physical storage area). In each storage node 101, two or more physical chunks in two or more different storage nodes 101 may be associated with each logical chunk. For the same program pair, the logical chunk associated with the active I/O control program 6A and the logical chunk associated with the standby I/O control program 6S may be respectively associated with two or more same physical chunks. The corresponding relationship between logical chunks and physical chunks may be managed by the cluster control program 5 (or another program).

Figures 3, 4:
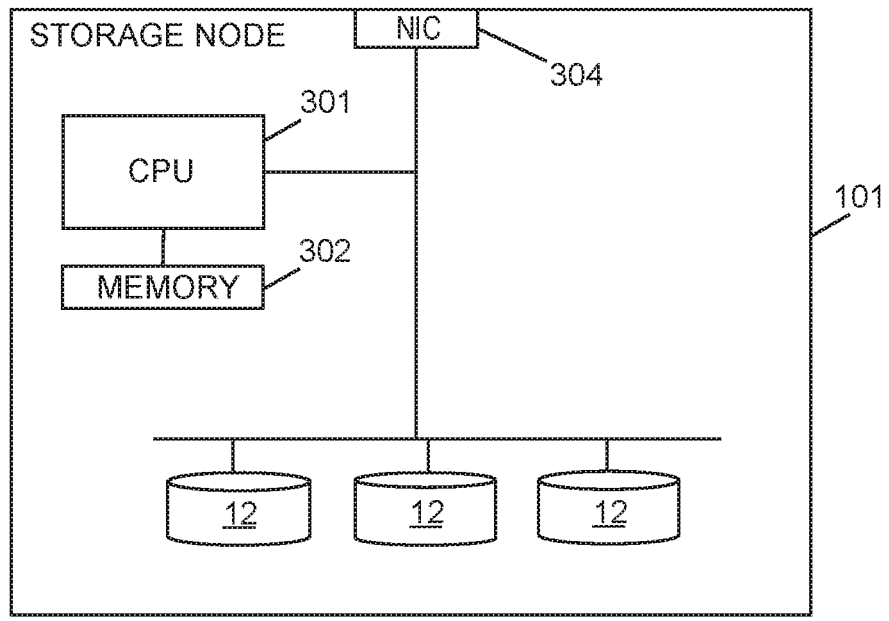
FIG. 3 illustrates a physical configuration of a storage node.
FIG. 4 illustrates an exemplary configuration of a node management table.

FIG. 3 illustrates a physical configuration of the storage node 101.

The storage node 101 may be a general-purpose computer. The storage node 101 has network interface card (NIC) 304, PDEV 12, memory 302, and CPU 301 coupled to them. Each of the NIC 304, the PDEV 12, the memory 302 and CPU 301 may be configured as a plurality of units. The NIC 304 is an example of the interface unit. The PDEV 12 is an example of the PDEV unit. The memory 302 is an example of the memory unit. The PDEV 12 and the memory 302 are examples of the storage unit. The CPU 301 is an example of the processor unit.

The NIC 304 may be coupled to the frontend network 61, and the NIC 304 may be coupled to the backend network 62. The NIC 304 is an interface device for communicating with external devices of the storage node 101. The NIC 304 may be any of a fibre channel card, an Ethernet (registered trademark) card, an InfiniBand card, a wireless LAN card, and a PCIe host adapter.

As mentioned above, the PDEV 12 may be any of a HDD and an SSD, or may be a storage class memory (SCM). The PDEV 12 may be coupled by any interface of NVMe (Non-Volatile Memory Express), SAS (Serial Attached SCSI (Small Computer System Interface)) and SATA (Serial ATA (Advanced Technology Attachment)). Further, different types of PDEVs may be mixed as a plurality of PDEVs 12.

The memory 302 may include a volatile semiconductor memory such as SRAM (Static RAM (Random Access Memory)) or DRAM (Dynamic RAM). The memory 302 is usable to temporarily store various programs and necessary data.

The CPU 301 controls the entire operation of the storage node 101 by executing programs (for example, the above-mentioned programs 5 and 6) in the memory 302.

FIG. 4 illustrates an exemplary configuration of the node management table 221.

The node management table 221 holds information on the storage node 101. For example, the node management table 221 has an entry for each storage node 101. Each entry stores information such as node ID 401, state 402, importance 403, reliability 404, data importance 405, I/O importance 406, and cluster importance 407. Hereinafter, one storage node 101 ("object node 101" in the description of FIG. 4) will be taken as an example.

The node ID 401 indicates ID of the object node 101. The state 402 indicates whether the object node 101 is in operation ("Active"). The importance 403 indicates the degree of importance determined by the importance determination function 211 based on the reliability 404, the data importance 405, and the I/O importance 406. The reliability 404 indicates the degree of reliability determined by the reliability determination function 212 through below-described processing. The data importance 405 indicates the degree of data importance based on the redundancy of the user dataset. The I/O importance 406 indicates the degree of I/O importance determined based on the redundancy of the I/O control program 6. The cluster importance 407 indicates the degree of cluster importance determined based on the redundancy of the master cluster control program 5. The data importance, the I/O importance, and the cluster importance are determined by the importance determination function 211.

In the present embodiment, the importance 403, the reliability 404, the data importance 405, the I/O importance 406, and the cluster importance 407 are classified into two levels of "high" and "low" and may be classified into three or more levels. Further, in the present embodiment, the importance 403 is determined based on all of the data importance 405, the I/O importance 406, and the cluster importance 407, although it may be determined partly based on the data importance 405, the I/O importance 406, and the cluster importance 407.

FIG. 5 illustrates an exemplary configuration of the data arrangement management table 222.

The data arrangement management table 222 holds information on the arrangement of user datasets. The cluster control program 5 updates the data arrangement management table 222 according to a change in the arrangement of user datasets. For example, the data arrangement management table 222 has an entry for each group of the same user datasets (composed of user datasets with the redundancy of 0 or more). Each entry stores information such as group ID 501, node ID (Master dataset) 502, and node ID (Mirror dataset) 503. Hereinafter, one group ("object group" in the description of FIG. 5) will be taken as an example.

The group ID 501 indicates ID of the object group. The node ID (Master dataset) 502 indicates ID of the storage node 101 where a master (original) user dataset among object groups is arranged. The node ID (Mirror dataset) 503 indicates ID of one or more storage nodes 101 where one or more mirror (copy) user dataset among object groups is arranged.

FIG. 6 illustrates an exemplary configuration of the I/O arrangement management table 223.

The I/O arrangement management table 223 holds information on the arrangement of the I/O control program 6. The cluster control program 5 updates the I/O arrangement management table 223 according to a change in the arrangement or state (active or standby) of the I/O control program 6. For example, the I/O arrangement management table 223 has an entry for each program pair. Each entry stores information such as pair ID 601, node ID (Active) 602, and node ID (Standby) 603. Hereinafter, one program pair ("object pair" in the description of FIG. 6) will be taken as an example.

The pair ID 601 indicates ID of the object pair. The node ID (Active) 602 indicates ID of the storage node 101 where the active I/O control program 6A among object pairs is arranged. The node ID (Standby) 603 indicates ID of the storage node 101 where the standby I/O control program 6S among object pairs is arranged.

FIG. 7 illustrates an exemplary configuration of the cluster arrangement management table 224.

The cluster arrangement management table 224 holds information on the arrangement of the master cluster control program 5. The cluster control program 5 updates the cluster arrangement management table 224 according to a change in the arrangement or state (primary or secondary) of the master cluster control program 5. For example, the cluster arrangement management table 224 holds ID of the storage node 101 where the primary master cluster control program 5 is arranged and ID of one or more storage nodes 101 where one or more secondary master cluster control programs 5 are arranged.

FIG. 8 illustrates an exemplary configuration of the node failure management table 225.

The node failure management table 225 holds time point 801 (failure occurrence time point) that is time information indicating the occurrence of a failure in the storage node 101 and node ID 802 that indicates ID of the storage node 101 as the location where the failure occurred. The cluster control program 5 updates the node failure management table 225 each time the occurrence of a failure is detected.

FIG. 9 illustrates an exemplary configuration of the reintegration determination table 226.

The reintegration determination table 226 indicates a relationship (rule) between a combination of the importance 403 and the reliability 404 (refer to FIG. 4) and whether to perform reintegration.

According to the present embodiment, the master cluster control program 5 manages the resource arrangement (arrangement and redundancy of the user dataset, the I/O control program 6, and the master cluster control programs 5) in the storage cluster. The master cluster control program (for example, the primary program) 5 determines the necessity of updating the importance 403 according to a configuration change of the storage cluster (for example, a change in resource arrangement of the storage cluster) and updates the importance 403 if necessary. Further, the master cluster control program 5 detects the occurrence of failure (for example, unexpected reboot) in the storage node 101 and records the failure occurrence time point and the node ID (ID of the storage node 101 where the failure occurred) in the node failure management table 225. The master cluster control program 5 refers to the node failure management table 225 for a targeted storage node 101 and determines the reliability from failure occurrence tendency of this storage node 101, and records determined reliability 404 in the node management table 221. The storage node 101 autonomously manages the importance 403 and the reliability 404 recorded in the node management table 221, whereby enabling autonomous control of the reintegration of the storage node 101.

As mentioned above, in the present embodiment, it is determined for the targeted storage node 101 whether to reintegrate the storage node 101 from the viewpoint of the importance and the reliability of this storage node 101. The importance depends on highness of the availability when assuming that the storage node 101 has left the storage cluster and relates to whether the storage node 101 is to be reintegrated. The reliability depends on tendency of operation (for example, the tendency of failure occurrence) in the storage node 101 and relates to whether to perform reintegration. The storage node 101 is reintegrated when the importance is high (for example, equal to or larger than a predetermined importance level) and the reliability is high (for example, equal to or larger than a predetermined reliability level). In other words, if the importance is low, the storage node 101 is not an object of the reintegration, and if the reliability is low, the storage node 101 is not reintegrated even when the storage node 101 is targeted for the reintegration. This makes it possible to prevent the stability of the storage cluster from degrading even when the reintegration of the storage node is automated.

The importance will be described with reference to FIGS. 10 to 15. More specifically, the data importance, the I/O importance, and the cluster importance will be described as the basis of importance. Particularly, among the data importance, the I/O importance, and the cluster importance, the I/O importance and cluster importance are importance levels reflecting the viewpoint according to the characteristic configuration of the storage system 100 according to the present embodiment. More specifically, a control plane and a data plane coexist in the SDS 180 (refer to FIG. 1) realized based on a plurality of storage nodes 101. The control plane corresponds to a dispersedly arranged cluster control program 5. The data plane corresponds to a dispersedly arranged I/O control program 6.

Figures 10, 11:
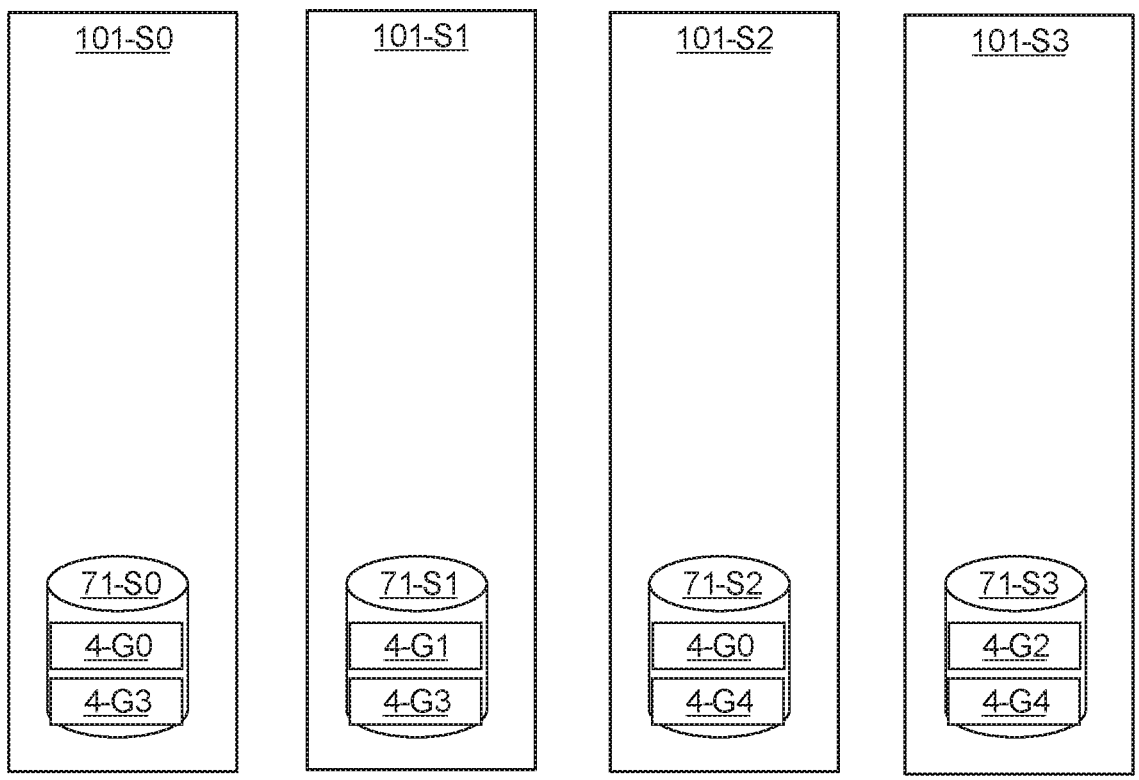
FIG. 10 is a schematic diagram illustrating an example of data importance determination.
FIG. 11 illustrates a data arrangement management table that reflects the data arrangement in FIG. 10.

FIG. 10 is a schematic diagram illustrating an example of data importance determination. FIG. 11 illustrates the data arrangement management table 222 that reflects the data arrangement in FIG. 10.

The data importance of the object storage node 101 (for example, the storage node 101 where the failure occurred) depends on the redundancy of at least one user dataset 4 stored in the object storage node 101.

The importance determination function 211 specifies the redundancy of the user dataset 4 for each user dataset in the object storage node 101 (for example, the storage node 101 where the failure occurred), with reference to the data arrangement management table 222. The importance determination function 211 performs data importance determination for determining whether the number of user datasets whose redundancy is equal to or less than a predetermined value (for example, 0) is equal to or larger than a predetermined number (for example, 1). When the result of the data importance determination is true, the importance determination function 211 sets the data importance of the object storage node 101 to "high". When the result of the data importance determination is false, the importance determination function 211 sets the data importance of the object storage node 101 to "low". In the case of setting three or more levels for the data importance, the value of the data importance may be determined according to the number of the user datasets 4 or the like for each redundancy.

When the data importance is "high", the possibility that the importance becomes "high" is increased (it may be regarded as data importance "high"=importance "high"). Thus, it is possible to increase the possibility that the storage node 101 having the user dataset 4 lower in redundancy is targeted for the reintegration.

According to the example illustrated in FIGS. 10 and 11, it is as follows.

When the storage node 101-S0 or 101-S3 is an object storage node, the data importance is "high". This is because both the user dataset 4-G0 in the storage node 101-S0 and the user dataset 4-G2 in the storage node 101-S3 have the redundancy of the predetermined value 0 (in the data arrangement management table 222, for each of groups G0 and G2, one of the node IDs 502 and 503 is an invalid value (or blank)). More specifically, when the storage node 101-S0 or 101-S3 leaves the storage cluster, it becomes impossible to access the user dataset 4-G0 or 4-G2 from the host node 51.

When the storage node 101-S1 or 101-S2 is an object storage node, the data importance is "low". This is because all of the user datasets 4-G1 and 4-G3 in the storage node 101-S1 and the user datasets 4-G0 and 4-G4 in the storage node 101-S2 have the redundancy exceeding the predetermined value 0.

Figures 12, 13:
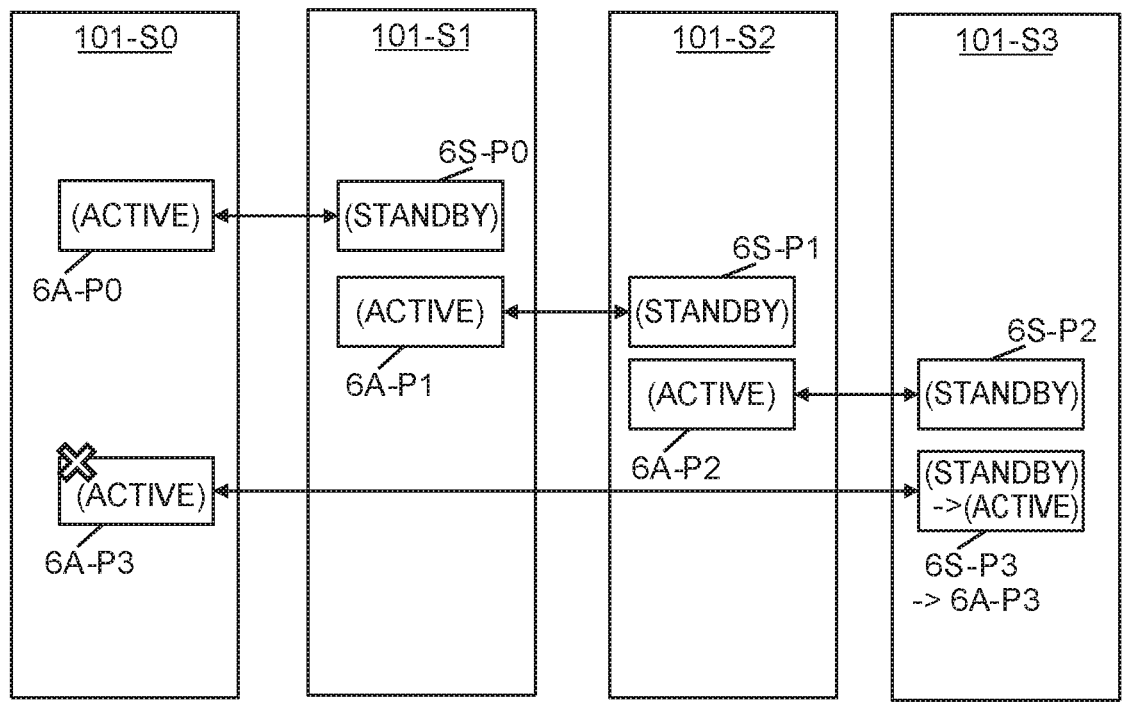
FIG. 12 is a schematic diagram illustrating an example of I/O importance determination.
FIG. 13 illustrates an I/O arrangement management table that reflects the program arrangement in FIG. 12.

FIG. 12 is a schematic diagram illustrating an example of I/O importance determination. FIG. 13 illustrates the I/O arrangement management table 223 that reflects the program arrangement in FIG. 12.

The I/O importance of the object storage node 101 (for example, the storage node 101 where the failure occurred) depends on the redundancy of the I/O control program 6 in the program pair of at least one I/O control program 6 arranged in the object storage node 101.

Regarding the object storage node 101, the importance determination function 211 specifies the redundancy of the I/O control program 6 based on the I/O arrangement management table 223 for each I/O control program 6 in the object storage node 101. The importance determination function 211 performs I/O importance determination for determining whether the number of I/O control programs 6 whose redundancy is equal to or less than a predetermined value (for example, 0) is equal to or larger than a predetermined number (for example, 1). When the result of the I/O importance determination is true, the importance determination function 211 sets the I/O importance of the object storage node 101 to "high". When the result of the I/O importance determination is false, the importance determination function 211 sets the I/O importance of the object storage node 101 to "low". In the case of setting three or more levels for the I/O importance, the value of the I/O importance may be determined according to the number of the I/O control programs 6 or the like for each redundancy.

When the I/O importance is "high", the possibility that the importance becomes "high" is increased (it may be regarded as I/O importance "high"=importance "high"). Thus, it is possible to increase the possibility that the storage node 101 having the I/O control program 6 lower in redundancy is targeted for the reintegration.

According to the example illustrated in FIGS. 12 and 13, it is as follows.

When the storage node 101-S0 or 101-S3 is an object storage node, the I/O importance is "high". This is because active I/O control program 6A-P3 in the storage node 101-S0 is stopped and failover is performed, and standby I/O control program 6S-P3 in the storage node 101-S3 is switched to the active I/O control program 6A-P3, and as a result, for the program pair P3, the redundancy of the I/O control program 6 has become 0 (in the I/O arrangement management table 223, for the program pair P2, the node ID (Standby) 603 is an invalid value (or blank)).

When the storage node 101-S1 or 101-S2 is an object storage node, the I/O importance is "low". This is because there is no I/O control program 6 whose redundancy is 0 in each of the storage nodes 101-S1 and 101-S2.

Figures 14, 15:
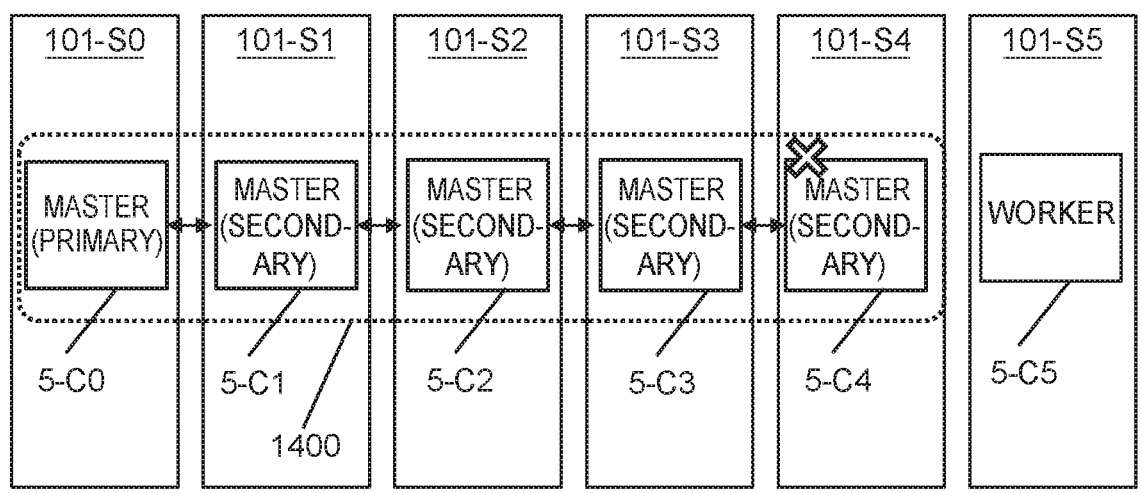
FIG. 14 is a schematic diagram illustrating an example of cluster importance determination.
FIG. 15 illustrates a cluster arrangement management table that reflects the program arrangement in FIG. 14.

FIG. 14 is a schematic diagram illustrating an example of cluster importance determination. FIG. 15 illustrates the cluster arrangement management table 224 that reflects the program arrangement in FIG. 14.

The cluster importance of the object storage node 101 (for example, the storage node 101 where the failure occurred) depends on a remaining master node number of the storage cluster (an example of the remaining node number). The remaining master node number is the number of master storage nodes 101 having normal master cluster control program 5 (master cluster control program 5 not stopped). Accordingly, if the object storage node 101 is not included in Q master storage nodes 101 where the Q master cluster control programs 5 are arranged, the remaining master node number is equal to Q. On the other hand, if the object storage node 101 is included in the Q master storage nodes 101, the remaining master node number is expressed by Q–(number of object storage nodes).

The importance determination function 211 refers to the cluster arrangement management table 224 and counts the remaining master node number of the storage cluster (for example, the number of effective node IDs in the cluster arrangement management table 224). The importance determination function 211 performs cluster importance determination for determining whether the remaining master node number is equal to or less than a threshold of the remaining master node number. When the result of the cluster importance determination is true, the importance determination function 211 sets the cluster importance of the object storage node 101 to "high". When the result of the cluster importance determination is false, the importance determination function 211 sets the cluster importance of the object storage node 101 to "low". In the case of setting three or more levels for the cluster importance, the value of the cluster importance may be determined according to the difference between the remaining master node number and its threshold.

When the cluster importance is "high", the possibility that the importance becomes "high" is increased (it may be regarded as cluster importance "high"=importance "high"). Thus, it is possible to increase the possibility that the storage node 101 having the master cluster control program 5 lower in the remaining master node number is targeted for the reintegration.

Here, the threshold of the remaining master node number is a value obtained by adding the number of the storage nodes 101 that can be simultaneously targeted for the reintegration to the majority of Q.

More specifically, for example, in the present embodiment, the threshold of the remaining master node number is expressed by $\mathrm{Ceil}((Q+1)/2)+1$.

"$\mathrm{Ceil}((Q+1)/2)$" represents the majority of Q (Ceil means decimal point round up). The reason why the majority of Q is required is to prevent split-brain syndrome from occurring even when the master cluster control program 5 is split due to communication path failure between the master storage nodes 101 or the like.

"+1" is an example of the number of the storage nodes 101 that can be simultaneously targeted for the reintegration (in other words, can simultaneously leave the storage cluster).

In a case where the number of the storage nodes 101 that can be simultaneously targeted for the reintegration is 1, if the remaining master node number coincides with $\mathrm{Ceil}((Q+1)/2)+1$, when a failure such as unexpected reboot occurs in another master storage node 101, the number of the master storage nodes 101 will be less than $\mathrm{Ceil}((Q+1)/2)$. Therefore, in the present embodiment, when the remaining master node number is equal to or less than its threshold, the cluster importance is set to "high".

According to the example illustrated in FIGS. 14 and 15, in a master cluster control program group 1400, since normal master cluster control programs 5-C0 to 5-C3 exist in four storage nodes 101-S0 to 101-S3, the remaining master node number is 4. The threshold of the remaining master node number is $\mathrm{Ceil}((5+1)/2)+1=4$. As a result, since the remaining master node number is equal to or less than its threshold, the cluster importance is set to "high".

Figure 16:
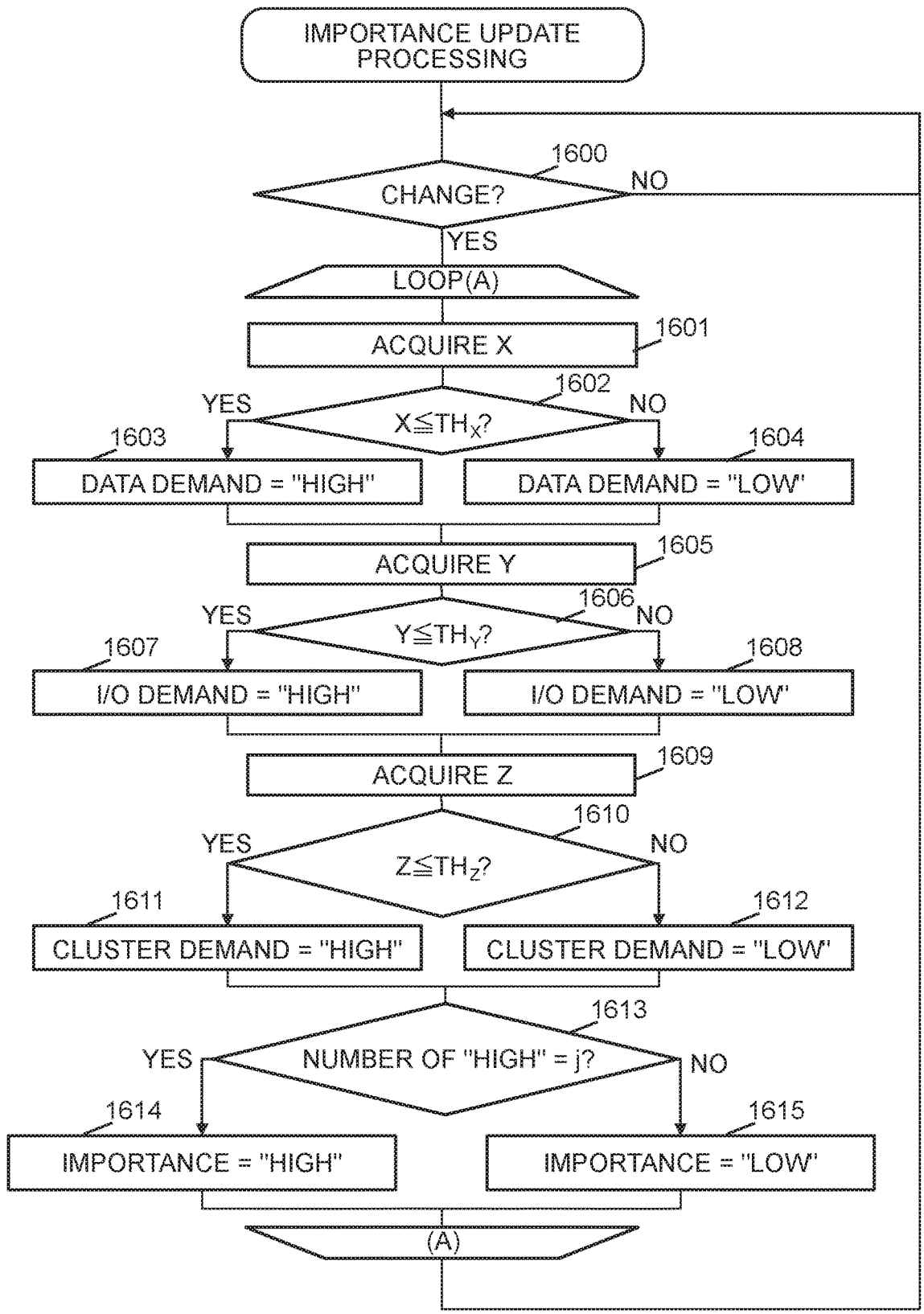
FIG. 16 is a diagram illustrating a flowchart of importance update processing.

FIG. 16 illustrates a flowchart of importance update processing. The importance determination function 211 performs the importance update processing.

When there is any change in the resource arrangement of the storage cluster (Yes in step 1600), the importance determination function 211 performs processing of loop (A), i.e., steps 1601 to 1615, for the number of the storage nodes 101. Hereinafter, one storage node 101 will be taken as an example ("object node 101" in the description of FIG. 16).

The importance determination function 211 acquires redundancy X of the user dataset 4 in the object node 101 with reference to the data arrangement management table 222 (step 1601). The importance determination function 211 determines whether at least one acquired redundancy X is equal to or less than its threshold $TH_X$ (step 1602). When the determination result in step 1602 is true (Yes in step 1602), the importance determination function 211 records "high" for the data importance 405 of the object node 101 in the node management table 221 (step 1603). When the determination result in step 1602 is false (No in step 1602), the importance determination function 211 records "low" for the data importance 405 of the object node 101 in the node management table 221 (step 1604).

The importance determination function 211 acquires redundancy Y of the I/O control program 6 in the object node 101 with reference to the I/O arrangement management table 223 (step 1605). The importance determination function 211 determines whether at least one acquired redundancy Y is equal to or less than its threshold $TH_Y$ (step 1606). When the determination result in step 1606 is true (Yes in step 1606), the importance determination function 211 records "high" for the I/O importance 406 of the object node 101 in the node management table 221 (step 1607). When the determination result in step 1606 is false (No in step 1606), the importance determination function 211 records "low" for the I/O importance 406 of the object node 101 in the node management table 221 (step 1608).

The importance determination function 211 acquires remaining master node number Z with reference to the cluster arrangement management table 224 (step 1609). The importance determination function 211 determines whether the acquired remaining master node number Z is equal to or less than its threshold $TH_Z$ (step 1610). When the determination result in step 1610 is true (Yes in step 1610), the importance determination function 211 records "high" for the cluster importance 407 of the object node 101 in the node management table 221 (step 1611). When the determination result in step 1610 is false (No in step 1610), the importance determination function 211 records "low" for the cluster importance 407 of the object node 101 in the node management table 221 (step 1612).

The importance determination function 211 refers to the node management table 221 and, with respect to the object node 101, determines whether j or more (j is a natural number, for example j=1) out of the data importance 405, the I/O importance 406, and the cluster importance 407 are "high" (step 1613). When the determination result in step 1613 is true (Yes in step 1613), the importance determination function 211 records "high" for the importance 403 of the object node 101 in the node management table 221 (step 1614). When the determination result in step 1613 is false (No in step 1613), the importance determination function 211 records "low" for the importance 403 of the object node 101 in the node management table 221 (step 1615).

In the loop (A), processing according to the type of a resource whose arrangement has been changed may be selected among the first processing (steps 1601 to 1604), the second processing (steps 1605 to 1608), and the third processing (steps 1609 to 1612), and the processing of step 1613 may be performed after the selected processing is completed.

Figure 17:
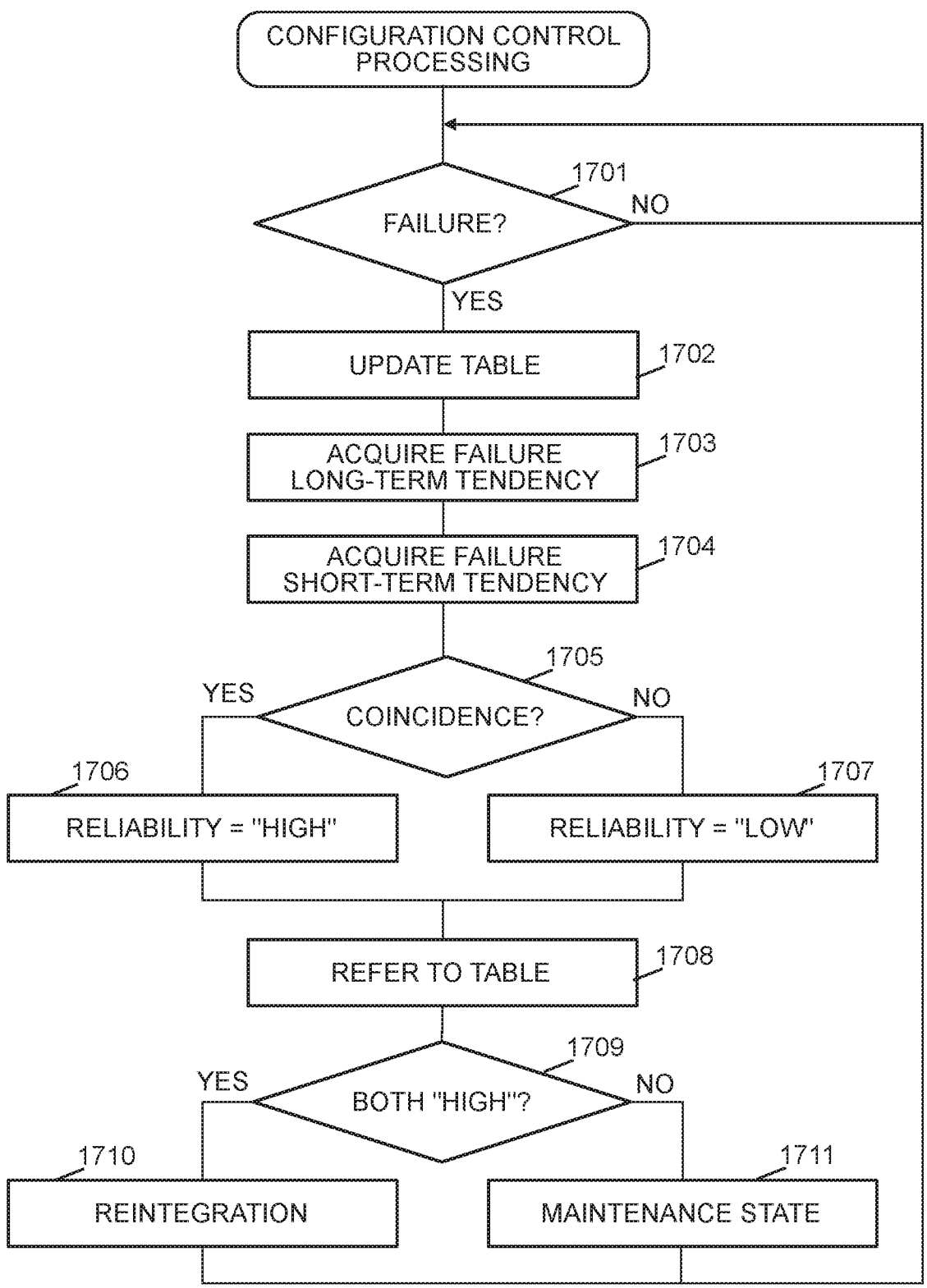
FIG. 17 is a diagram illustrating a flowchart of configuration control processing.

FIG. 17 illustrates a flowchart of configuration control processing. The reliability determination function 212 and the reintegration determination function 213 perform the configuration control processing.

If the occurrence of a failure is detected in any of the storage nodes 101 (Yes in step 1701), processing of step 1702 and subsequent steps is performed. Hereinafter, in the description of FIG. 17, the node 101 where the failure occurred is referred to as "failure node 101". The failure node 101 is an example of the object storage node.

The reliability determination function 212 records the failure occurrence time point and the node ID of the node where the failure occurred in the node failure management table 225 (step 1702).

The reliability determination function 212 refers to the node failure management table 225, and acquires recent long-term failure tendency (tendency of failure occurrence in a long period of time) of the failure node 101 (step 1703). The reliability determination function 212 refers to the node failure management table 225 and acquires recent short-term failure tendency (tendency of failure occurrence in a short period of time) of the failure node 101 (step 1704). More specifically, the "recent long-term failure tendency" is the tendency of failure occurrence in a relatively long period (for example, one year) retrogressing from the present time. The "recent short-term failure tendency" is the tendency of failure occurrence in a relatively short period (for example, three months) retrogressing from the present time. Accordingly, the relatively short period may be part of the relatively long period.

The reliability determination function 212 determines whether the recent long-term failure tendency coincides with a first condition and the recent short-term failure tendency coincides with a second condition (step 1705). The description "the recent long-term failure tendency coincides with the first condition" may be replaced by another expression such as "the number of times of the failure occurrence in a relatively long period is less than a first number-of-times threshold". The description "the recent short-term failure tendency coincides with the second condition" may be replaced by another expression such as "the number of times of the failure occurrence in a relatively short period is less than a second number-of-times threshold". Acquiring the tendency of failure occurrence for both of the relatively long period and the relatively short period is useful in improving the accuracy of reliability. More specifically, although there is a failure occurring intermittently in a relatively long period after it once occurred, such as cell failure of a semiconductor memory, the expression "the recent long-term failure tendency coincides with the first condition" can cover this kind of failure. Further, although there is a failure occurring frequently in a relatively short period after it once occur, such as HDD failure, the expression "the recent short-term failure tendency coincides with the second condition" can cover this kind of failure. Both the long-term failure tendency and the short-term failure tendency are examples of the tendency of failure occurrence. Since the reliability is calculated according to the tendency of failure occurrence, it can be expected to be high in the accuracy of reliability and accordingly it can be expected to be high in the accuracy of determining whether to perform the reintegration based on both the importance and the reliability.

When the determination result in step 1705 is true (Yes in step 1705), the reliability determination function 212 records "high" for the reliability 404 of the failure node 101 in the node management table 221 (step 1706). When the determination result in step 1705 is false (No in step 1705), the reliability determination function 212 records "low" for the reliability 404 of the failure node 101 in the node management table 221 (step 1707).

The reintegration determination function 213 refers to the node management table 221 and the reintegration determination table 226 (step 1708).

The reintegration determination function 213 determines whether both of the importance 403 and the reliability 404 are "high" with respect to the failure node 101 (more specifically, whether both of the importance 403 and the reliability 404 of the failure node 101 satisfy the condition for performing the reintegration) (step 1709).

When the determination result in step 1709 is true (Yes in step 1709), the reintegration determination function 213 performs reintegration for the failure node 101 (step 1710). When the determination result in step 1709 is false (No in step 1709), the reintegration determination function 213 brings the failure node 101 into a maintenance state (for example, disconnects the failure node 101 from the storage cluster (closes, in the present embodiment) for the maintenance) (step 1711).

The primary master cluster control program 5 may perform the importance update processing in FIG. 16 and the configuration control processing in FIG. 17. When the primary master cluster control program 5 is stopped, one of the secondary master cluster control programs 5 may become primary according to the result of exchanges between the secondary master cluster control programs 5, and the master cluster control program 5 having become primary may perform the importance update processing in FIG. 16 and the configuration control processing in FIG. 17.

Further, the tendency of failure occurrence in the failure node 101 is an example of the tendency of operation of the failure node 101. More specifically, the reliability of the failure node 101 may be determined based on another operation tendency of the failure node 101 (for example, tendency of communication band, memory amount used, and CPU load (for example, usage rate or the number of CPU cores used) of the failure node 101), instead of or in addition to the tendency of failure occurrence.

Figure 18:
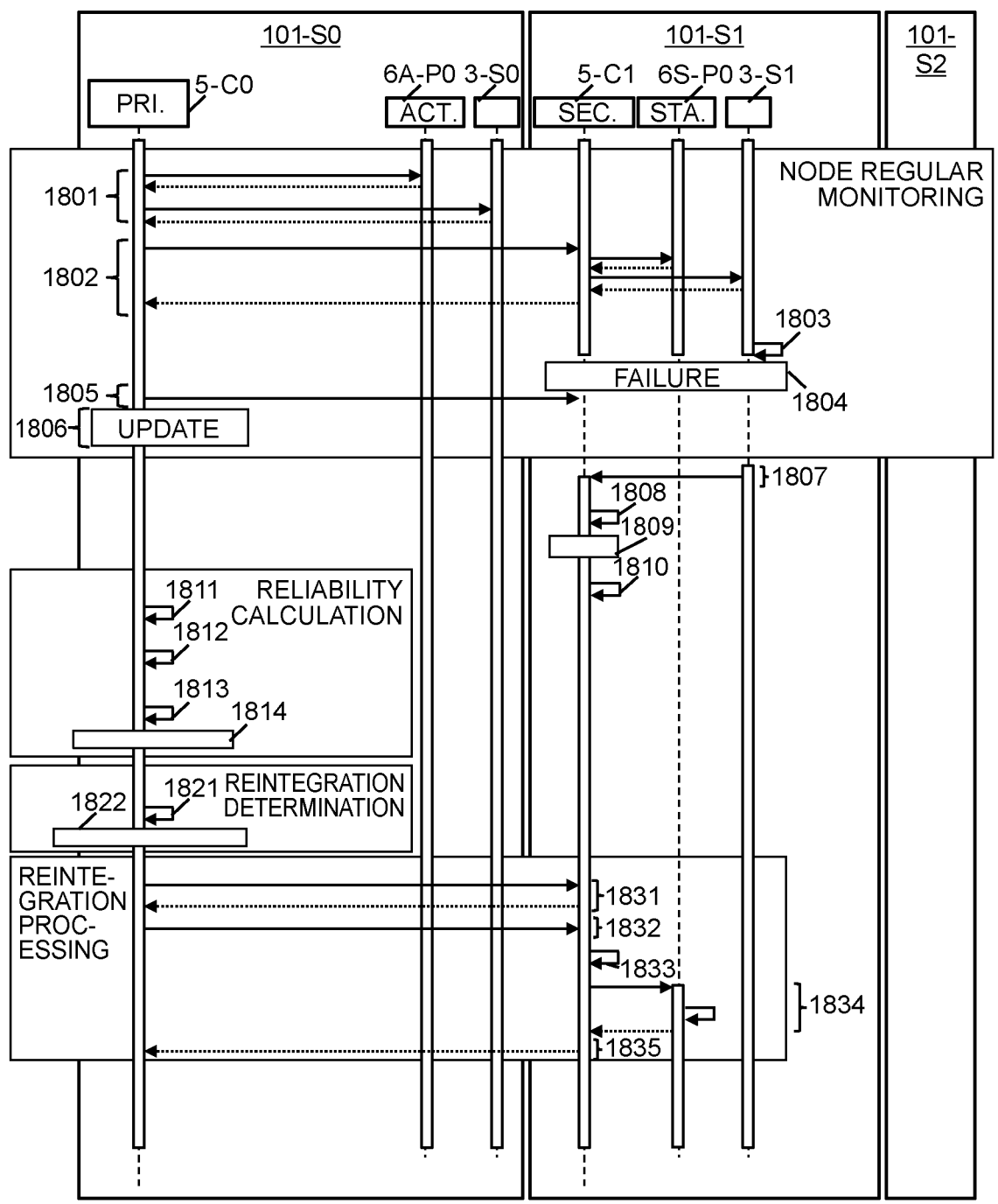
FIG. 18 is a sequence diagram illustrating the configuration control processing.

FIG. 18 is a sequence diagram illustrating the configuration control processing. In FIG. 18, "Pri." stands for primary, "Act." stands for active, "Sec." stands for secondary, and "Sta." stands for standby. In the description of FIG. 18, the primary master cluster control program is simply referred to as "primary program" and the secondary master cluster control program is referred to as "secondary program". As the secondary program, the program 5-C1 will be taken as an example.

Node regular monitoring is performed between the cluster control programs 5 in the storage cluster. For example, the primary program 5-C0 performs failure monitoring (for monitoring whether there is any failure occurrence) on the resource (for example, I/O control program 6A-P0 and operating system (OS) 3-S0) in the storage node 101-S0 having this program 5-C0 (step 1801). "Sn" in the reference character of the OS is ID of the storage node having the OS (n is an integer such as 0, 1, 2, . . . ). Further, the primary program 5-C0 performs failure monitoring on the storage node 101-S1 having the secondary program 5-C1 (step 1802). For example, the primary program 5-C0 requests the secondary program 5-C1 for failure monitoring. In response to this request, the secondary program 5-C1 performs failure monitoring on the resource (for example, I/O control program 6S-P0 and OS 3-S1) in the storage node 101-S1 and sends the result to the primary program 5-C0.

In the storage node 101-S1, it is now assumed that an error occurs in the OS 3-S1 (step 1803) and as a result, a failure of unexpected reboot has occurred (step 1804). In this case, the primary program 5-C0 detects the occurrence of the failure in the failure monitoring of the storage node 101-S1 (step 1805), and records failure occurrence time point and ID "S1" of the node 101 where the failure occurred in the node failure management table 225 (step 1806). The storage node 101-S1 is hereinafter referred to as "failure node 101-S1" in the description of FIG. 18.

In the failure node 101-S1, the OS 3-S1 starts up the secondary program 5-C1 after step 1804 (step 1807). The secondary program 5-C1 performs diagnostic processing (step 1808). When the result of a diagnostic path is obtained (step 1809), the secondary program 5-C1 waits for reintegration determination (step 1810).

The primary program 5-C0 performs configuration control processing, more specifically, performs reliability calculation and reintegration determination.

In the reliability calculation, the primary program 5-C0 refers to a node failure management table 225-S0 and acquires the long-term failure tendency of the failure node 101-S1 (step 1811). Further, the primary program 5-C0 refers to the node failure management table 225-S0 and acquires the short-term failure tendency of the failure node 101-S1 (step 1812). The primary program 5-C0 calculates the reliability of the failure node 101-S1 based on the acquired long-term failure tendency and the acquired short-term failure tendency (step 1813). The primary program 5-C0 records the calculated reliability in a node management table 221-S0 (step 1814).

In the reintegration determination, the primary program 5-C0 refers to the node management table 221-S0 and a reintegration determination table 226-S0 (step 1821), and determines whether to perform reintegration of the failure node 101-S1 based on the importance 403 and the reliability 404 of the failure node 101-S1. Here, it is assumed that the primary program 5-C0 determines to reintegrate of the failure node 101-S1 (step 1822). In this case, the reintegration processing (steps 1831 to 1834) is performed.

More specifically, in the failure monitoring of the failure node 101-S1 (step 1831), the primary program 5-C0 specifies that the failure node 101-S1 is waiting for the reintegration determination based on the response from secondary program 5-C1 in the failure node 101-S1. In this case, the primary program 5-C0 notifies the secondary program 5-C1 of the result of the reintegration determination (determination result of reintegrating the failure node 101-S1) (step 1832). In response to this notification, the secondary program 5-C1 performs start processing (step 1833) and starts up the standby I/O control program 6S-P0 (step 1834). Then, the secondary program 5-C1 notifies the primary program 5-C0 of completion of the startup (step 1835).

Although one embodiment of the present invention has been described, it is a mere example for describing the present invention and the scope of the present invention is not limited to this embodiment. The present invention can be implemented in various forms.

What is claimed is:

1. A storage system including N storage nodes that are members of a storage cluster (N being an integer equal to or larger than 3), wherein
a first storage node that is any one of the N storage nodes
determines whether importance of a second storage node is equal to or larger than a predetermined importance and reliability of the second storage node is equal to or larger than a predetermined reliability, the second storage node being a storage node set as an object among storage nodes other than the first storage node, when the determination result is true, performs reintegration which is processing for causing the second storage node to leave the storage cluster and causing the second storage node to become a member of the storage cluster again, the importance of the second storage node depends on highness of availability when assuming that the second storage node has left the storage cluster, the reliability of the second storage node depends on tendency of operation of the second storage node each of the N storage nodes comprises a processor unit, the N storage nodes comprise Q cluster control programs (Q being an integer equal to or larger than 2 and equal to or smaller than N), the Q cluster control programs are respectively arranged in Q storage nodes, the Q cluster control programs includes
  a primary cluster control program; and
  one or more secondary cluster control programs, the one or more secondary cluster control programs each being a cluster control program other than the primary control program, and arranged in one or more storage nodes other than a storage node where the primary cluster control program is arranged, the primary cluster control program, when executed by the processor unit in a storage node where the primary cluster control program is arranged, manages a cluster serving as the storage system, when the primary cluster control program is stopped, any one of the one or more secondary cluster control programs becomes primary instead of the primary cluster control program, the importance of the second storage node depends on a remaining node number that is Q when the second storage node is not included in Q storage nodes where the Q cluster control programs are arranged and is a value obtained by subtracting the number of the second storage nodes from Q when the second storage node is included in the Q storage nodes, the importance of the second storage node depends on whether the remaining node number is equal to or less than a threshold of the remaining node number, and the threshold of the remaining node number is a value obtained by adding the number of storage nodes having a possibility to simultaneously be targeted for the reintegration to the majority of Q.

2. The storage system according to claim 1, wherein the N storage nodes further comprise
  P program clusters (P being a natural number) and
each of the P program clusters includes
  an active input/output (I/O) control program; and
  one or more standby I/O control programs, the one or more standby I/O control programs each being an I/O control program other than the active I/O control program, and arranged in one or more storage nodes other than a storage node where the active I/O control program is arranged, the active I/O control program, when executed by the processor unit in a storage node where the I/O control program is arranged, writes a dataset for one or more storage nodes, when the active I/O control program is stopped, any one of the one or more standby I/O control programs becomes active instead of the active I/O control program, the importance of the second storage node depends on redundancy of at least one dataset stored in the second storage node, and
  redundancy of I/O control program in the program cluster with respect to at least one I/O control program arranged in the second storage node.

3. The storage system according to claim 1, wherein the importance of the second storage node depends on redundancy of the dataset with respect to at least one dataset stored in the second storage node.

4. The storage system according to claim 1, wherein the tendency of operation of the second storage node includes tendency of failure occurrence in the second storage node.

5. The storage system according to claim 4, wherein the tendency of failure occurrence in the second storage node includes the tendency of failure occurrence in a recent long period of the second storage node and the tendency of failure occurrence in a recent short period of the second storage node.

6. A cluster configuration control method including:
  determining whether importance of an object storage node is equal to or larger than a predetermined importance and reliability of the object storage node is equal to or larger than a predetermined reliability, the object storage node being a storage node set as an object among N storage nodes that are members of a storage cluster (N being an integer equal to or larger than 3); and
  when the determination result is true, performing reintegration which is processing for causing the object storage node to leave the storage cluster and causing the object storage node to become a member of the storage cluster again, wherein
    the importance of the object storage node depends on highness of availability when assuming that the object storage node has left the storage cluster,
    the reliability of the object storage node depends on tendency of operation of the object storage node
    each of the N storage nodes comprises a processor unit,
    the N storage nodes comprise Q cluster control programs (Q being an integer equal to or larger than 2 and equal to or smaller than N),
    the Q cluster control programs are respectively arranged in Q storage nodes,
    the Q cluster control programs includes
      a primary cluster control program; and
      one or more secondary cluster control programs, the one or more secondary cluster control programs each being a cluster control program other than the primary control program, and arranged in one or more storage nodes other than a storage node where the primary cluster control program is arranged,
    the primary cluster control program, when executed by the processor unit in a storage node where the primary cluster control program is arranged, manages a cluster serving as the storage system,
    when the primary cluster control program is stopped, any one of the one or more secondary cluster control programs becomes primary instead of the primary cluster control program, the importance of the second storage node depends on a remaining node number that is Q when the second storage node is not included in Q storage nodes where the Q cluster control programs are arranged and is a value obtained by subtracting the number of the second storage nodes from Q when the second storage node is included in the Q storage nodes, the importance of the second storage node depends on whether the remaining node number is equal to or less than a threshold of the remaining node number, and the threshold of the remaining node number is a value obtained by adding the number of storage nodes having a possibility to simultaneously be targeted for the reintegration to the majority of Q.

7. A non-transitory computer readable medium storing a program for controlling a computer that improves stability and reduces deterioration, when executed by a processor, causes the processor to:

determine whether importance of an object storage node is equal to or larger than a predetermined importance and reliability of the object storage node is equal to or larger than a predetermined reliability, the object storage node being a storage node set as an object among N storage nodes that are members of a storage cluster (N being an integer equal to or larger than 3); and when the determination result is true, performing reintegration which is processing for causing the object storage node to leave the storage cluster and causing the object storage node to become a member of the storage cluster again, wherein the importance of the object storage node depends on highness of availability when assuming that the object storage node has left the storage cluster, the reliability of the object storage node depends on the tendency of operation of the object storage node each of the N storage nodes comprises a processor unit, the N storage nodes comprise Q cluster control programs (Q being an integer equal to or larger than 2 and equal to or smaller than N), the Q cluster control programs are respectively arranged in Q storage nodes, the Q cluster control programs includes
    a primary cluster control program; and
    one or more secondary cluster control programs, the one or more secondary cluster control programs each being a cluster control program other than the primary control program, and arranged in one or more storage nodes other than a storage node where the primary cluster control program is arranged, the primary cluster control program, when executed by the processor unit in a storage node where the primary cluster control program is arranged, manages a cluster serving as the storage system, when the primary cluster control program is stopped, any one of the one or more secondary cluster control programs becomes primary instead of the primary cluster control program, the importance of the object storage node depends on a remaining node number that is Q when the object storage node is not included in Q storage nodes where the Q cluster control programs are arranged and is a value obtained by subtracting the number of the object storage nodes from Q when the object storage node is included in the Q storage nodes, the importance of the object storage node depends on whether the remaining node number is equal to or less than a threshold of the remaining node number, and the threshold of the remaining node number is a value obtained by adding the number of storage nodes having a possibility to simultaneously be targeted for the reintegration to the majority of Q.

* * * * *